United States Patent Office 3,310,154
Patented Mar. 21, 1967

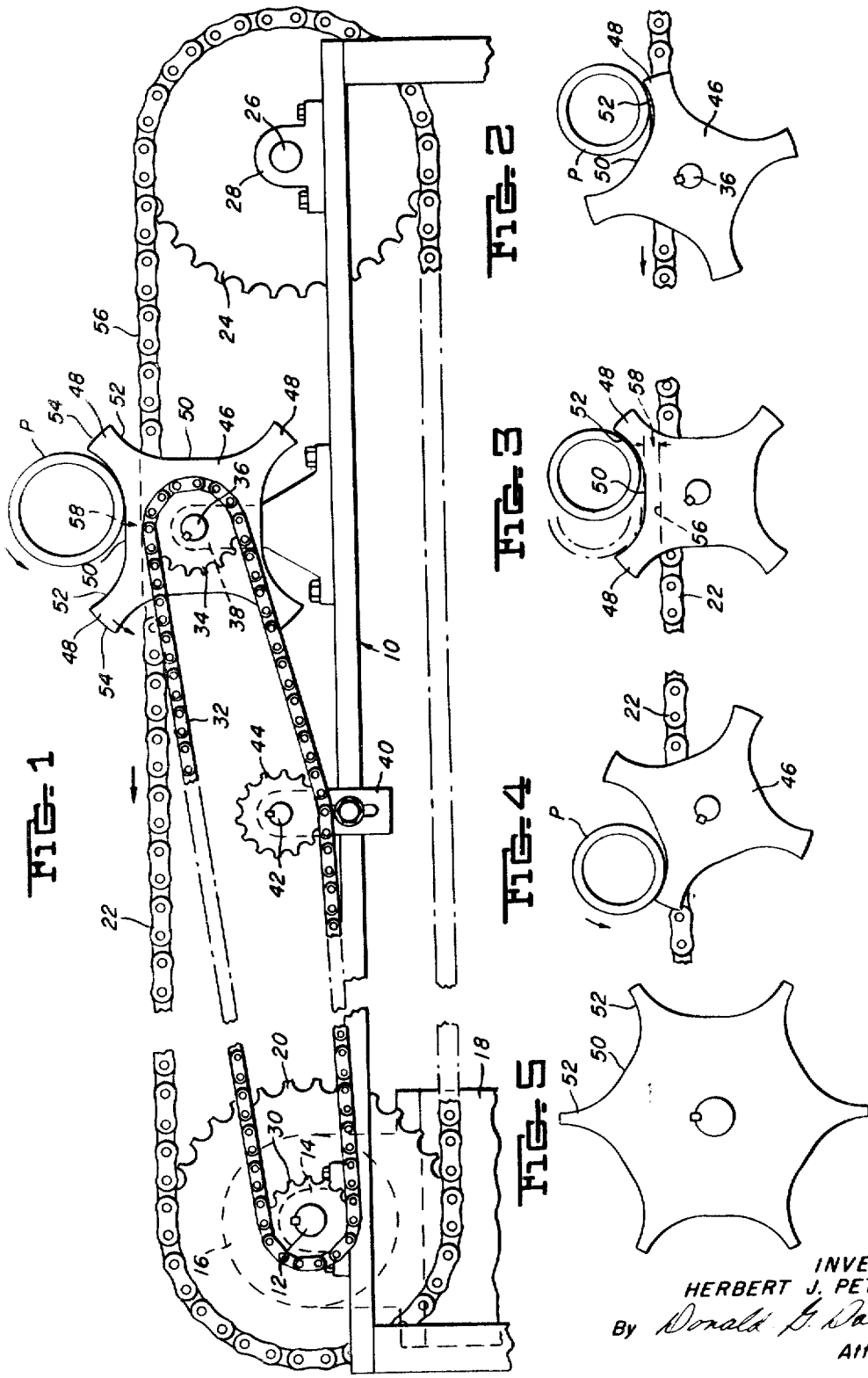

3,310,154
APPARATUS FOR PICKING UP AND ROLLING PIPE LENGTHS WHILE TRAVELING SIDEWISE ON CHAIN CONVEYOR
Herbert J. Peterson, McKeesport, Pa., assignor to United States Steel Corporation, a corporation of Delaware
Filed Sept. 24, 1965, Ser. No. 489,855
3 Claims. (Cl. 198—33)

This invention relates to a chain conveyor for moving pipe lengths sidewise in combination with a star-shaped wheel for sequentially picking up, rolling and lowering a pipe length back onto the conveyor chains.

Prior to storage or shipment, it is customary to subject pipe lengths to such operations as inspection, coating and the like. According to the invention, the spaced pipe lengths are conveyed sidewise without rotation on driven conveyor chains spaced to support the pipe lengths for visual or automatic inspection or to coating means, whereby a portion of the pipe surface is inspected or coated. To complete these operations, the pipe lengths are rotated one or more times on their axes through some angle, for example, about 90 degrees. For this purpose, driven star-shaped wheels or plates are mounted for rotation parallel to the conveyor chains. Preferably synchronized as to relative movement with the chains, an edge of each wheel sequentially picks up, rolls and lowers a pipe length onto the chains. The remainder of the pipe length may then be inspected or coated. Should the angle through which the pipe length is rotated not be sufficient, the above-described operation may be repeated, as required.

In the accompanying drawings illustrating the invention:

FIGURE 1 is a side elevation of apparatus of invention comprising conveyor chains and star-shaped wheels;

FIGURES 2, 3 and 4 are diagrammatic representations of a four-sided, star-shaped wheel showing sequential positions thereof and of a pipe length rotated thereby through a definite angle; and FIGURE 5 is a diagrammatic representation of a six-sided, star-shaped wheel.

As shown in FIGURE 1, the apparatus combination supported on a longitudinal frame 10 comprises a shaft 12 journaled in transversely-spaced bearings 14 and driven by a motor 16 supported on a base 18. A plurality of transversely-spaced sprocket wheels 20 keyed to shaft 12 each drives an endless conveyor chain 22 which in turn drives one of a plurality of sprocket wheels 24 keyed to a shaft 26 journaled in spaced bearings 28.

Shaft 12 is also keyed to a sprocket wheel 30 that drives an endless chain 32 which in turn drives a sprocket wheel 34 keyed to a shaft 36 journaled in transversely-spaced bearings 38. Proper tension on chain 32 is maintained by an idler plate 40, that journals a stub shaft 42 to which is keyed a sprocket wheel 44 meshing with chain 32. Idler plate 40 is adjustably mounted on frame 10. A plurality of transversely-spaced, four-sided star-shaped plates or wheels 46 are keyed to shaft 36 and rotate in planes parallel to chains 22 and 32 and intermediate the ends of chains 22. For handling pipe lengths P, wheels 46 have circumferentially-spaced radial arms 48 and straight edges 50 joining the adjacent arms. Arms 48 preferably comprise opposed arcuate edges 52, joined at their outer extremities or leading ends by edges 54, dimensioned to provide the required rigidity. The arcuate edges 52 of adjacent arms 48 are tangent to and join straight edges 50.

Preferably, the number and pitch of the teeth of the respective sprocket wheels should be such as to synchronize the movements of chains 22 with respect to star-shaped wheels 46. Then pipe lengths P may be placed on chains 22 by hand or by automatic means (not shown) so that the leading arcuate edges 52 are positioned to pick up pipe lengths P from conveyors 22 as shown in FIGURE 2.

Preferably, the radius of the arcuate edges 52 is substantially the same as the radius of the outside surface of pipe length P. When a pipe length P rolls on straight edges 50 of wheels 46 it should rotate through some given angle, i.e., substantially that subtended by an arc of the pipe circumference corresponding to the length of an edge 50.

To permit rolling of a pipe length P on straight edge 50, shaft 36 should position edge 50 at least about one quarter inch above a horizontal line 56 defining the upper, pipe-supporting portions of chains 22 when straight edge 50 is rotated parallel thereto as shown in FIGURE 3. This spacing 58 may vary with the diameter of the pipe lengths handled. With larger pipe, this spacing may vary up to about three quarters of an inch. The length of the pipe-handling edges 50, 52 will increase with increase in spacing 58. Also, for any given diameter pipe, the spacing 58 may vary directly with the angle the pipe is rotated, as may the length of straight edge 50.

As an example of my apparatus combination shown in FIGURE 1, the use thereof is shown in FIGURES 2, 3 and 4 for handling a pipe length P of 4½" O.D. (outside diameter) pipe with respect to two parallel chains 22. Synchronization between chains 22 and two spaced wheels 46 is obtained with 1" pitch roller chains 22 moving on sprocket wheels 20, 24, each having 36 teeth or sprockets on 1" pitch. Roller chain 32 has a ⅜" pitch and its sprocket wheels 30, 34 and 44 each have 20 teeth on ⅜" pitch. The star-shaped wheels 46 are cut from two circular plates having a diameter of about 9", the opposed straight edges 50 are about 4½" apart and the radii of arcuate edges 52 are about 2¼". Spacing 58 is about ½".

As shown in FIGURE 2, a pipe length P placed on chains 22 has been moved sidewise thereon without rotation and is in position to be picked up by a leading end of an arcuate edge 52. During rotation of wheels 46 to their FIGURE 3 position, the pipe is moved upward and will thereafter roll on edge 50 in the direction of wheel rotation. Thereafter, the pipe rotates further in the same direction as it is lowered from the end of arcuate edge 52 onto chains 22. At this point the desired degree of rotation of the pipe is complete, which according to this example is about 90 degrees. The apparatus can handle successive pipe lengths having their axes spaced apart about 9".

In FIGURE 5 is shown a six-sided, shaped wheel for rotating 6⅝" O.D. pipe about 90 degrees in the above-described apparatus. Cut from circular plates having a diameter of about 15¾", the opposed straight edges 50 are about 10½" apart and the radii of the arcuate edges 52 are about 3¾₆". When assembled with chains 22 the spacing 58 is about 7⁄16".

While the above examples illustrate preferred apparatus and methods of operation, changes therein may be made without departing from the spirit of the invention. Depending on the length of the pipe to be handled, the number of chains and star-shaped wheels may be varied. The number of sides of the equilateral star-shaped wheels may be varied as may the angle through which each side may rotate a pipe length.

Although I have disclosed herein the preferred practice and apparatus of invention, I intend to cover as well any change or modification therein which may be made without departing from the spirit and scope of invention.

I claim:

1. In an apparatus for picking up and rotating pipe lengths while traveling sidewise, the combination with spaced, driven conveyor chains adapted to move pipe lengths sidewise without rotation, of spaced driven star-shaped wheels mounted for rotation intermediate the ends of said chains, said wheels having straight edges joining circumferentially spaced radial arms, whereby on rotation of a said wheel a pipe length is sequentially picked up from said chains by one of said arms, rolled on one of said straight edges against the back of the preceding one of said arms and thereby lowered onto said chains, said arms comprising opposed arcuate edges, the arcuate edges of each adjacent arm being tangent to said straight edges.

2. The combination as defined in claim 1 characterized by said arcuate edges having radii substantially the same as the radii of the outside surface of said pipe lengths.

3. The combination as defined in claim 2 characterized by means adapted to synchronize the movements of said chains and star wheels.

References Cited by the Examiner

German Printed Application 1,056,029, April 1959.

EVON C. BLUNK, *Primary Examiner.*

R. E. AEGERTER, *Examiner.*